June 10, 1924.

J. R. ACOSTA

DIRECTION INDICATOR

Original Filed April 17, 1922

1,497,286

J. R. Acosta
INVENTOR
BY Victor J. Evans
ATTORNEY

WITNESS:

Patented June 10, 1924.

1,497,286

UNITED STATES PATENT OFFICE.

JUAN RUIZ ACOSTA, OF MEXICO, MEXICO.

DIRECTION INDICATOR.

Application filed April 17, 1922, Serial No. 553,323. Renewed April 30, 1924.

*To all whom it may concern:*

Be it known that I, JUAN RUIZ ACOSTA, a subject of the King of Spain, residing at Mexico city, in the Republic of Mexico, have invented new and useful Improvements in Direction Indicators, of which the following is a specification.

This invention relates to direction signals for motor operated vehicles or the like, and contemplates certain improvements in the attachment illustrated in my pending application filed August 22d, 1921, and bearing Serial Number 494,234.

The chief characteristic of this invention resides in the provision of a pair of swinging members which are mounted upon the vehicle to project beyond the sides of the windshield standards, and susceptible of rotation, the signalling members being of novel construction and equipped with means to illuminate the same.

Another object of the invention resides in providing each signalling member with an electric light bulb for illuminating the member, and covering the bulb at opposite sides of the member with a shade, so that the brilliancy of the light will not in any way affect the vision of the driver of the vehicle or others.

The nature and advantages of the invention will be better understood when the following detailed description is read in connection with the accompanying drawing, the invention residing in the construction, combination, and arrangement of parts as claimed.

In the drawing forming part of this application, like numerals of reference indicate similar parts in the several views, and wherein:—

Figure 1:
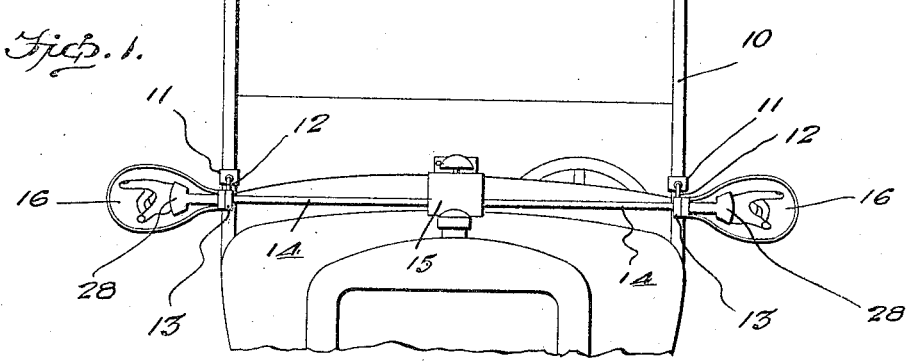
Figure 1 is a view in elevation, showing the signal mounted upon the windshield standards.
Figure 2:
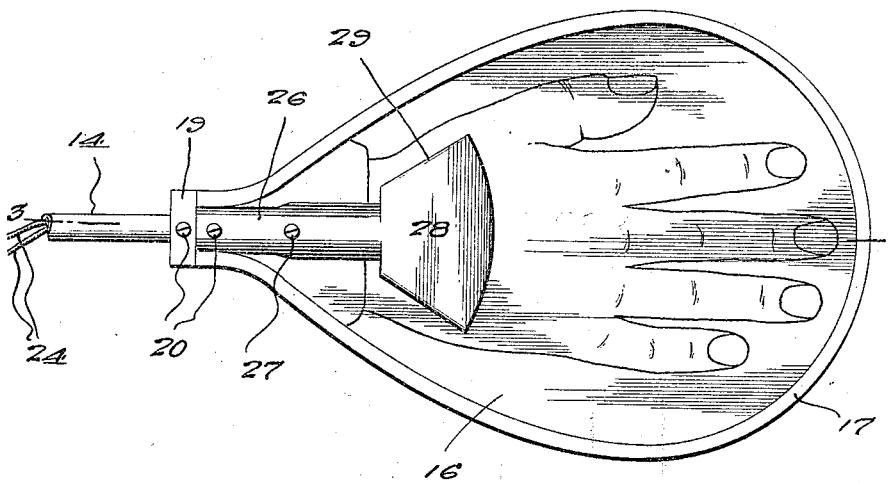
Figure 2 is an enlarged side elevation of one of the signalling members.
Figure 3:
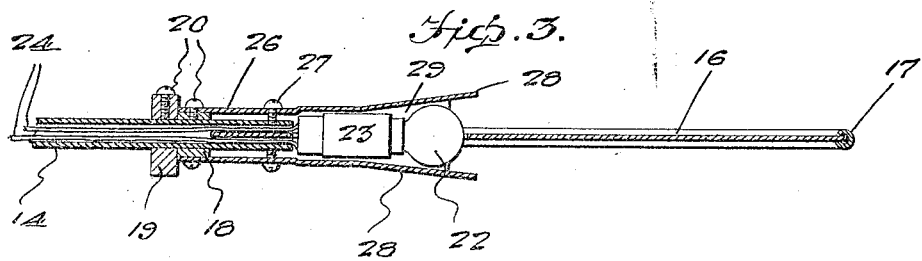
Figure 3 is a sectional view taken on line 3—3 of Figure 2.

Referring to the drawing in detail, 10 indicates the windshield standards of a motor operated vehicle, and on these standards is arranged clamps 11, each of which is provided with an arm 12 which supports a bearing 13. Journaled in each of these bearings is a hollow shaft 14, which is capable of partial rotation in either direction, and the adjacent extremities of these shafts are fitted in a bearing 15. The shafts may be rotated in any suitable manner, preferably by means illustrated in my co-pending application, but as this does not form any part of the present invention, it is not deemed necessary to describe the same.

Each shaft 14 supports at its outer end a signalling member which is preferably fan-shaped, although this member may vary in size and configuration without departing from the spirit of the invention. The member is indicated at 16 and is mounted in a frame 17, the frame being terminally secured to a collar 18 which bears against a disk 19 and both the collar and disk are secured to the shaft 14 for rotation therewith, through the instrumentality of fastening elements, such as screws or the like 20. The design of a hand is arranged on either side of the signalling member, one side showing the index finger of the hand pointing in a particular direction, so that when this side of the signalling member is presented to view of the drivers of other vehicles, it indicates the intention of the driver of the vehicle with which the signal is equipped to turn in that particular direction. The hand on the other side of the signalling member when presented to the view of others indicates the intention of the driver of the vehicle to bring the machine to a stop.

For the purpose of illuminating the signalling member, the latter is equipped with an electric light bulb 22 which is fitted in a socket 23, the socket being arranged in end to end relation with the particular shaft 14, and the conducting wires 24 of the bulb are passed through the said shaft as shown. The electric light bulb and its socket is arranged in a similar-shaped opening 25 provided in the signalling member, so that a part of the bulb projects from either side of the said member. Consequently, when the bulb is lighted, the signalling member is illuminated so that it can be readily seen at night time.

For the purpose of preventing the brilliancy of the light to affect the vision of the driver of the machine, or the vision of others in the vicinity of the machine, I make use of a shade or covering for the bulb, and one of these shades is arranged on each side of the signalling member. The shade includes a semi-cylindrical portion 26 which surrounds the adjacent end of the shaft 14 and a portion of the electric light socket, and secured to the shaft by means of screws or the like 27. Carried by one end of this portion 27 is a substantially segmental portion 28 which is provided with flanges at the sides thereof indicated at 29, and this part of the shade covers a portion of the bulb to protect the eyes of those in the vicinity of the machine from the effects of the brilliancy of the bulb.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

1. A direction signal of the character described, comprising a substantially fan-shaped member having indicia on both sides thereof, and an opening adjacent the small end, an electric light bulb arranged in said opening and projecting beyond both sides of said member, a segmental shade arranged at each side of said member and over said bulb, inwardly directed flanges carried by the sides of each shade and together with the latter completely covering said bulb for the purpose specified, and means for securing said shades in fixed relation to said member.

2. A direction signal of the character described, comprising a substantially fan-shaped member having an opening adjacent the small end thereof, indicia on both sides of said member, an electric light bulb arranged in said opening and projecting beyond both sides of the member, a collar spaced from the small end of the member, segmental shades carried by said collar and arranged at the opposite sides of said member covering said bulb, each shade including a semi-cylindrical portion partly embracing said collar and secured thereto, and inwardly directed flanges carried by the sides of the segmental portions and bearing against the adjacent side of said member, and means for holding said shades in fixed relation to the member.

In testimony whereof I affix my signature.

JUAN RUIZ ACOSTA.